United States Patent
Wu et al.

(10) Patent No.: US 8,368,249 B2
(45) Date of Patent: Feb. 5, 2013

(54) POWER SUPPLY UNIT PROVIDED WITH AC/DC INPUT VOLTAGE DETECTION AND POWER SUPPLY SYSTEM INCORPORATING SAME

(75) Inventors: Ching-Horng Wu, Taoyuan Hsien (TW); Chia-Tung Peng, Taoyuan Hsien (TW); Wei-Hsin Wen, Taoyuan Hsien (TW); Yu-Hung Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 305 days.

(21) Appl. No.: 12/829,600

(22) Filed: Jul. 2, 2010

(65) Prior Publication Data

US 2011/0127833 A1  Jun. 2, 2011

Related U.S. Application Data

(60) Provisional application No. 61/265,447, filed on Dec. 1, 2009.

(51) Int. Cl.
*H02J 7/00* (2006.01)
*H02J 9/00* (2006.01)

(52) U.S. Cl. .......................................................... 307/64
(58) Field of Classification Search .................. 307/64, 307/115, 31
See application file for complete search history.

(56) References Cited

U.S. PATENT DOCUMENTS 5,612,580 A * 3/1997 Janonis et al. .................. 307/64
5,982,652 A * 11/1999 Simonelli et al. ............. 363/142
6,700,351 B2 * 3/2004 Blair et al. .................... 320/125

* cited by examiner

*Primary Examiner* — Carlos Amaya
(74) *Attorney, Agent, or Firm* — Kirton McConkie; Evan R. Witt

(57) ABSTRACT

Disclosed is a power supply unit provided with AC/DC voltage detection and a power supply system incorporating such power supply unit. The power control unit of the power supply unit can manipulate the first stage power circuit and the bypass switch thereof according to the form and magnitude of the first voltage which is inputted to the power supply unit in order to boost the overall operating efficiency. When the inventive power supply unit is applied to a high-level DC power supply system, the problem that the power supply unit can not output a rated output voltage due to an insufficient DC first voltage can be avoided.

15 Claims, 5 Drawing Sheets

POWER SUPPLY UNIT PROVIDED WITH AC/DC INPUT VOLTAGE DETECTION AND POWER SUPPLY SYSTEM INCORPORATING SAME

CROSS-REFERENCE TO RELATED APPLICATION

This application claims the benefit of U.S. Provisional Application No. 61/265,447, filed on Dec. 1, 2009, and entitled "POWER SUPPLY UNIT WITH AC/DC INPUT VOLTAGE DETECTION AND POWER SUPPLY SYSTEM USING SAME", the entirety of which is hereby incorporated by reference.

FIELD OF THE INVENTION

The present invention relates to a power supply unit and a power supply system, and more particularly to a power supply unit provided with AC/DC voltage detection and power supply system incorporating such power supply unit.

MOTIVE OF THE INVENTION

Power supply apparatuses are essential for many electronic devices such as personal computers, industrial computers, servers, communication products or network products. Generally, the power consumption of the electronic device varies in different situations. For example, a power supply system may include multiple power supply units simultaneously providing electrical energy to one or more electronic devices such as data-processing equipment. Such configuration could increase the quality and reliability for power supply system. Even if the output power of the power supply system is sufficient to power the electronic device, one or more additional power supply units are served as backup power supply units in order to reduce the problems as a result of malfunction of one or more power supply units in the power supply system.

Generally, a conventional power supply unit employed in the power supply system for the data-processing equipment, for example, servers in the data center, is designed to receive a specified form of input voltage, such as AC input voltage. However, when the operator erroneously couples a DC power source to the input terminal of the power supply unit that requests AC power to operate and a DC input voltage is supplied from the DC power source to such power supply unit, the power supply unit may be burned down or malfunctioned due to the inconsistency between the input voltage provided from the external power source and the input voltage required by the power supply unit. Likewise, when the power supply unit is configured to receive a DC input voltage to operate and the operator erroneously connects an AC power source to the input terminal of such power supply unit, an AC power will be supplying to the power supply unit and thus the power supply unit may be burned down or malfunctioned due to the inconsistency between the input voltage provided from the external power source and the input voltage required by the power supply unit. When one or more power supply units of the power supply system are malfunctioned due to the reasons described above, the control unit of the power supply system can not accurately and efficiency manage the output power of the power supply units, thereby inhibiting the optimization of the power supply units.

There is a need of providing a power supply unit with AC/DC voltage detection and a power supply system incorporating such power supply unit so as to obviate the drawbacks encountered by the prior art.

SUMMARY OF THE INVENTION

An object of the invention is to provide a power supply unit with AC/DC voltage detection and a power supply system incorporating such power supply unit, in which the power supply unit can manage the operation of the first stage power circuit and bypass switch thereof according to the magnitude and the form of a first voltage (AC or DC) which serves as the input voltage for the power supply unit. When the power supply system is applied to a high-level DC power supply system, the problem that the power supply unit can not output a rated output voltage due to the insufficient input voltage can be avoided. The uninterruptible power supply of the power supply system can manually or automatically output an AC voltage or a DC voltage as the first voltage to boost the operating efficiency of the power supply. Moreover, the power supply system can be applied to a high-level DC power supply system or the contemporary AC power supply system.

To this end, a broad aspect of the invention is directed to a power supply unit provided with AC/DC voltage detection, which includes a first stage power circuit connected to a voltage bus for receiving a first voltage and generating a bus voltage accordingly, a second stage power circuit connected to the voltage bus for receiving the bus voltage and generating an output voltage accordingly, a bypass switch connected between an input terminal and an output terminal of the first stage power circuit, and a power control unit connected to the first stage power circuit, the second stage power circuit and the bypass switch for detecting whether the first voltage is a DC voltage or an AC voltage and manipulating the first stage power circuit and the bypass switch accordingly, in which the power control unit is configured to manipulate the bypass switch to turn on and off according to the form and magnitude of the input voltage.

To this end, another broad aspect of the invention is directed to a power supply system, which includes an uninterruptible power supply system for receiving an input voltage and outputting an AC voltage or a DC voltage as a first voltage, a plurality of power supply units for receiving the first voltage and converting the first voltage into an output voltage to power an electronic apparatus, and a power distribution unit connected between the uninterruptible power supply system and the power supply units for distributing the first voltage to the power supply units.

Now the foregoing and other features and advantages of the present invention will be best understood through the following descriptions with reference to the accompanying drawings, wherein:

DETAILED DESCRIPTION OF THE PREFERRED EMBODIMENT

Figure 1:
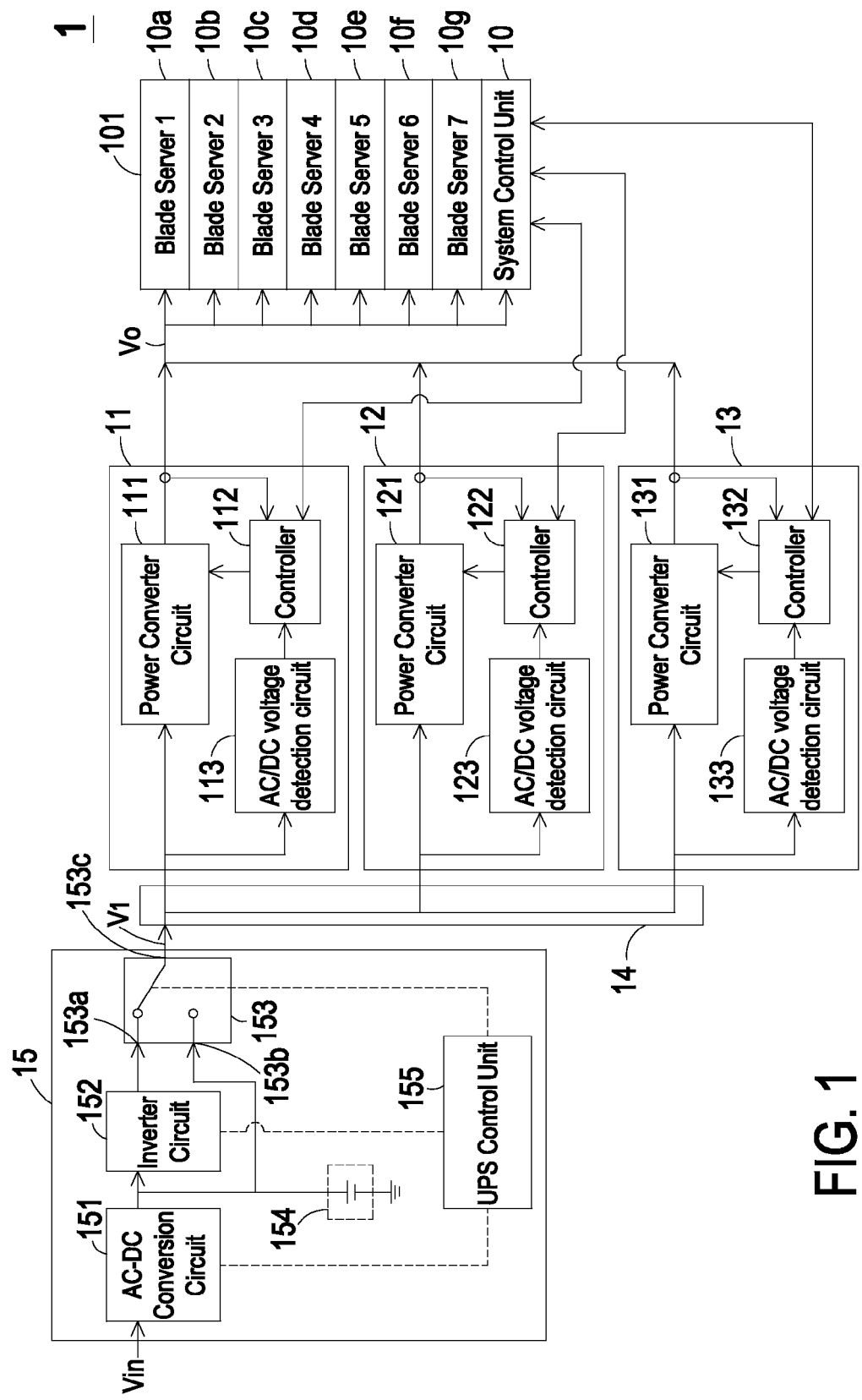
FIG. 1 is a circuit block diagram of power supply units provided with AC/DC voltage detection and the power supply system incorporating such power supply unit according to a preferred embodiment of the present invention.

FIG. 1 is a power supply unit with AC/DC voltage detection and the power supply system incorporating such power supply unit according to a preferred embodiment of the invention. As shown in FIG. 1, the power supply system 1 can be applied to data-processing equipment, for example, blade servers 10a-10g in a data center, so that the power supply system 1 can supply an output voltage Vo to the blade server 10a-10g and the system control unit 10 in the data center. In the instant embodiment, the power supply system 1 includes a plurality of power supply units, for example, a first power supply unit 11, a second power supply unit 12, and a third power supply unit 13, a power distribution unit (PDU) 14, and an uninterruptible power supply (UPS) system 15. The system control unit 10 is connected to the first power supply unit 11, a second power supply unit 12, and a third power supply unit 13 for receiving the output voltage Vo and manipulating the power supply units 11-13. Therefore, the first power supply unit 11, the second power supply unit 12, and the third power supply unit 13 can provide an accurate output power to the blade servers 10a-10g in order to optimize the operating efficiency.

Overall, the input voltage Vin provided by an utility grid is first delivered to the UPS system 15, thereby generating an uninterruptible first voltage V1. The uninterruptible first voltage V1 is distributed to the first power supply unit 11, the second power supply unit 12, and the third power supply unit 13 by the power distribution unit 14, so that the first voltage V1 is converted to a DC output voltage Vo having a voltage level of 12V, for example. The DC output voltage Vo is used to power the blade server 10a-10g and the system control unit 10.

In the instant embodiment, each of the first power supply unit 11, the second power supply unit 12, and the third power supply unit 13 includes a power converter circuit (111, 121, 131), a controller (112, 122, 132), and an AC/DC voltage detection circuit (113, 123, 133) for receiving the first voltage V1 and converting the first voltage V1 to a DC output voltage Vo. The UPS system 15 includes an AC-DC conversion circuit 151, an inverter circuit 152, a selection circuit 153, an energy storage unit 154, and an UPS control unit 155. The output terminal of the AC-DC conversion circuit 151 is connected to the input terminal of the inverter circuit 152 and the energy storage unit 154. The UPS control unit 155 is connected to the control terminal of the inverter circuit 152 and the selection circuit 153 for manipulating the UPS system 15. A first input terminal 153a of the selection circuit 153 is connected to the output terminal of the inverter 152. A second input terminal 153b of the selection circuit 153 is connected to the output terminal of the AC-DC conversion circuit 151 and the energy storage unit 154. Certainly, the internal constitution of the UPS system 15 is not limited to the precise form disclosed herein, and may have numerous modifications derived from the existing UPS topology or forthcoming UPS topology.

To boost the overall efficiency, the UPS control unit 155 manipulates the inverter circuit 152 and the selection circuit 153, thereby allowing the UPS system 15 to automatically or manually provide an AC voltage V1 or a DC voltage as a first voltage V1. When the UPS system 15 is outputting the first voltage V1 in DC form, for example, 400 VDC, the UPS control unit 155 manipulates the second input terminal 153b and the output terminal 153c of the selection circuit 153 to turn on and manipulates the inverter circuit 152 to turn off, thereby distributing the output voltage of the AC-DC conversion circuit 151 and the energy storage unit 154 to the input terminals of the power supply units 11-13 through the selection circuit 153 and the power distribution unit 14 without being converted by the inverter circuit 152. Therefore, the operating efficiency of the UPS system 15 is boosted. When the UPS system 15 is outputting the first voltage V1 in AC form, for example, 380 VAC, the UPS control unit 155 manipulates the first input terminal 153a and the output terminal 153c of the selection circuit 153 to turn on and manipulates the inverter circuit 152 to turn on, thereby distributing the output voltage of the inverter circuit 152 to the input terminals of the power supply units 11-13 through the selection circuit 153 and the power distribution unit 14. On the contrary, the power supply units 11-13 can be designed to receive an AC first voltage or a DC first voltage and can manipulate the power converter circuits (111, 121, 131) according to the form and magnitude of the first voltage V1, thereby boosting the operating efficiency of the power converter circuits (111, 121, 131).

Figure 2A:
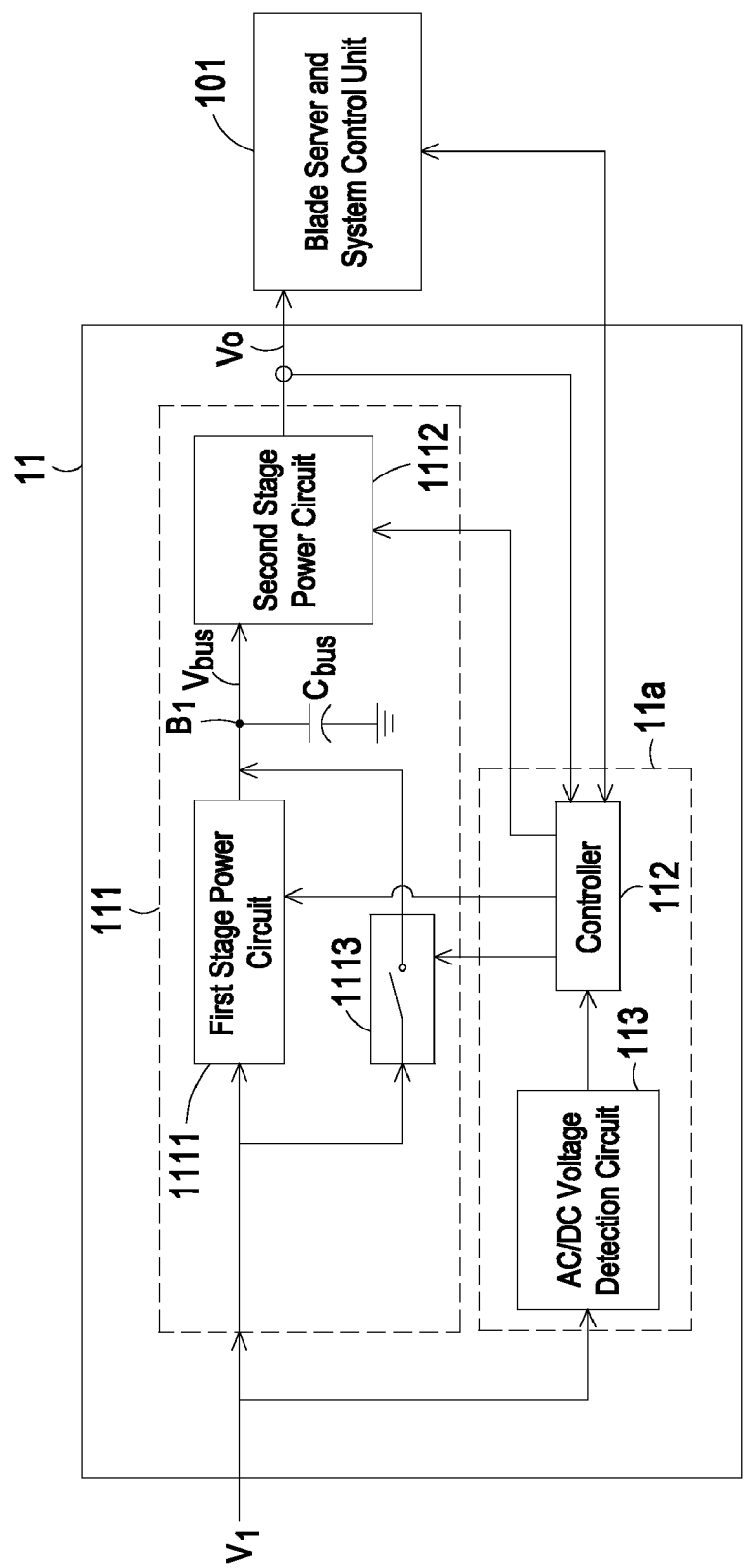
FIG. 2A is a circuit block diagram detailing a power supply unit provided with AC/DC voltage detection according to a preferred embodiment of the present invention.

In the instant embodiment, the power supply unit (11, 12, 13) possesses a similar circuit constitution and operating theorem with each other, and the first power supply unit 11 is taken as an illustrative example. Referring to FIG. 2a and FIG. 1, in which FIG. 2a is a circuit block diagram showing the power supply unit provided with AC/DC voltage detection according to the invention. As shown in FIG. 2a, the first power supply unit 11 includes a first stage power circuit 1111, a second stage power circuit 1112, a bypass switch 1113, a bus capacitor Cbus, a controller 112, and an AC/DC voltage detection circuit 113. The controller 112 and the AC/DC voltage detection circuit 113 constitute a power control unit 11a, and the first stage power circuit 1111, the second stage power circuit 1112, the bypass switch 1113, and the bus capacitor Cbus constitute a power converter unit 111.

The output terminal of the first stage power circuit 1111 is connected to the voltage bus B1, and may be implemented by a continuous conduction mode boost power factor correction converter (CCM Boost PFC converter), a critical conduction mode boost power factor correction converter (DCMB Boost PFC converter), or a buck-boost power factor correction converter (buck-boost PFC converter). The first stage power circuit 1111 is used to receive the first voltage V1 and configured to turn on and off by pulse width modulation signals or pulse frequency modulation signals in order to output the bus voltage Vbus to the voltage bus B1. In the instant embodiment, the first stage power circuit 1111 is rectified and boosted. In alternative embodiments, the first stage power circuit 1111 further possesses power factor correction function. The bus capacitor Cbus and the input terminal of the second stage power circuit 1112 is connected to the voltage bus B1. The second stage power circuit 1112 may be implemented by a forward converter, a flyback converter, a full-bridge converter, a half-bridge converter, or a buck converter. The second stage power circuit 1112 is used to receive the bus voltage Vbus and configured to turn on and off by pulse width modulation signals or pulse frequency modulation signals through a switching circuit in order to output the output voltage Vo.

The bypass switch 1113 is connected between the input terminal and the output terminal of the first stage power circuit 1111, and is manipulated by the controller 112. The AC/DC voltage detection circuit 113 is connected to the input terminal of the power converter circuit 111 and the controller 112 for detecting the form and magnitude of the first voltage V1. The controller 112 can acquire the form and magnitude of the first voltage V1 through the AC/DC voltage detection circuit 113. The controller 112 is connected to the control terminal of the first stage power circuit 1111, the second stage power circuit 1112, and the bypass switch 1113 for manipulating the first stage power circuit 1111, the second stage power circuit 1112, and the bypass switch 1113.

To boost the overall efficiency, the first power supply unit 11 is designed to receive the first voltage V1 and manipulates the first stage power circuit 1111 and the bypass switch 1113 according to the form and magnitude of the first voltage V1, thereby boosting the overall efficiency of the first power supply unit 11. When the first voltage V1 is an AC voltage, for example, 380 VAC, the controller 112 manipulates the bypass switch 1113 to turn off and manipulates the first stage power circuit 1111 to turn on, thereby enabling the first stage power circuit 1111 to generate the bus voltage Vbus. When the first voltage V1 is a DC voltage and is greater than a predetermined voltage Va, for example, the first voltage is a DC voltage greater than 320 VDC, the controller 112 manipulates the bypass switch 1113 to turn on and manipulates the first stage power circuit 1111 to turn off, thereby disabling the first stage power circuit 1111 from generating the bus voltage Vbus. Under this condition, the first voltage V1 does not need to be converted by the first stage power circuit 1111 and can be delivered to the voltage bus B1 through the bypass switch 1113, thereby boosting the operating efficiency of the first power supply unit 11. When first voltage V1 is a DC voltage and is smaller than a predetermined voltage Va, for example, the first voltage is a DC voltage smaller than 320 VDC, the second stage power circuit 1112 can not generate a rated output voltage such as 12 VDC if the insufficient first voltage V1 is directly delivered to the voltage bus B1. Under this condition, the controller 112 manipulates the bypass switch 1113 to turn off and manipulates the first stage power circuit 1111 to turn on, thereby enabling the first stage power circuit 1111 to generate the bus voltage Vbus.

In the instant embodiment, the AC/DC voltage detection circuit 113 is preferably implemented by a sampling unit, for example, an analog-to-digital conversion unit. However, the implementation of the AC/DC voltage detection circuit 113 is not to be exhaustively limited to the forms discussed herein. The AC/DC voltage detection circuit 113 is configured to produce a sampled value with reference to the magnitude of the first voltage V1 periodically with a sampling period, for example, 0.1 millisecond, and output the sampled value to the controller 112. The controller 112 accumulatively records the sampled value produced by the AC/DC voltage detection circuit 113, and determines whether the accumulated sample number Tn reaches the default sample number Th. If the accumulated sample number Tn reaches the default sample number Th, the controller 112 will perform an AC/DC voltage detection program to detect the form and magnitude of the first voltage V1.

Figure 2B:
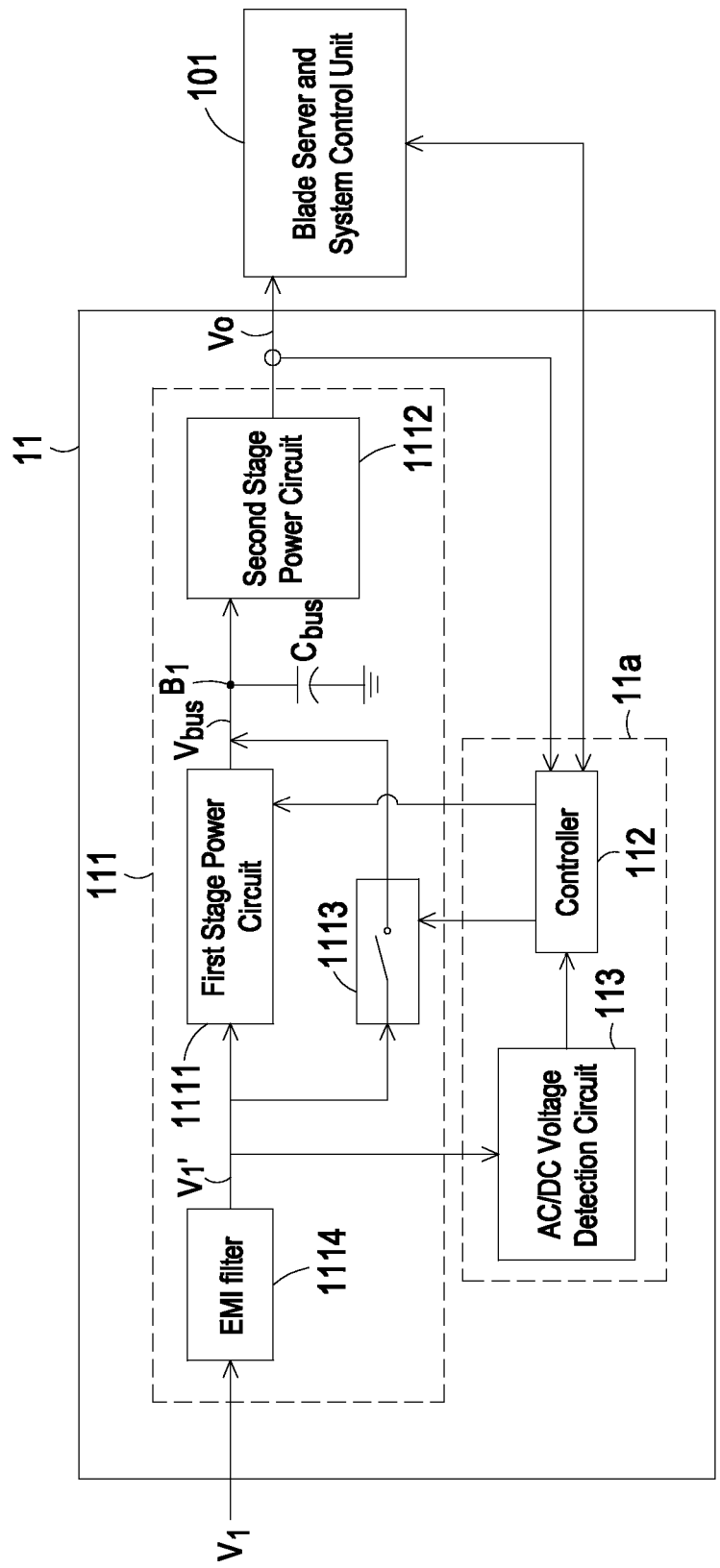
FIG. 2B is a circuit block diagram detailing a power supply unit provided with AC/DC voltage detection according to another preferred embodiment of the present invention.

Referring to FIG. 2B and FIG. 2A, in which FIG. 2B is a circuit block diagram showing the power supply unit with AC/DC voltage detection according to another preferred embodiment of the invention. The difference between FIG. 2B and FIG. 2A is that an EMI (electromagnetic interference) filter 1114 is incorporated in the circuitry of FIG. 2B and is connected before the first stage power circuit 111 for reducing electromagnetic interference. Hence, the first voltage V1' transmitted through the EMI filter 1114 to the AC/DC voltage detection circuit 113 will possess less noise and interference, so that the controller 112 can detect the form and magnitude of the first voltage V1 more accurately.

Figure 3:
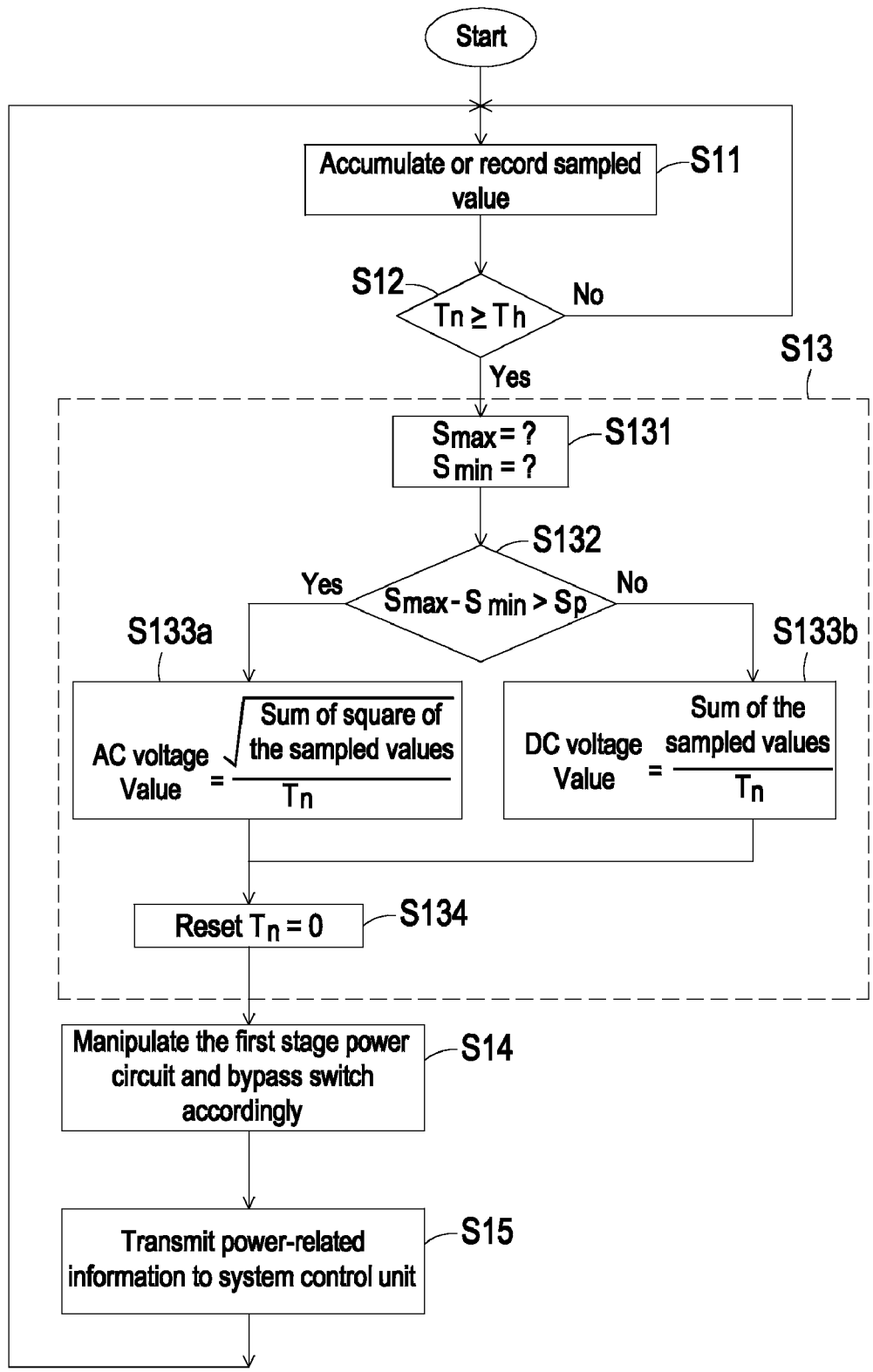
FIG. 3 is a flow chart showing the procedural steps of the AC/DC detection program carried out by the controller of the power supply unit.

Referring to FIG. 3, FIG. 1, FIG. 2A and FIG. 2B, in which FIG. 3 shows a flow chart illustrating the procedural steps carried out by the controller 112 according to a preferred embodiment of the invention. Referring to FIG. 3, in the beginning the controller 112 accumulates or records the sampled value produced by the AC/DC voltage detection circuit 113 at step S11. Next, the controller 112 determines whether the accumulated sample number Tn reaches the default sample number Th at step S12. The default sample number Th may be 1024, for example. If the accumulated sample number Tn does not reach the default sample number Th, the process continues with step S11. If the accumulated sample number Tn reaches the default sample number Th, the process continues with step S13 and performs an AC/DC voltage detection program to detect the form and magnitude of the first voltage V1.

Next, the controller seeks the maximum sampled value Smax and the minimum sampled value Smin at step S131. Next, the controller determines whether the differential value between the maximum sampled value Smax and the minimum sampled value Smin is greater than a predetermined differential value Sp at step S132. The predetermined differential value Sp may be set at 5V. When the differential value between the maximum sampled value Smax and the minimum sampled value Smin is greater than the predetermined differential value Sp, the first voltage V1 is identified as an AC voltage and the process continues with step S133$a$ is performed, thereby the voltage value of the first voltage V1 is calculated by a predetermined mathematical equation used to compute the magnitude of an AC voltage. In the instant embodiment, the value of an AC voltage is represented by the root mean square (rms) value of the AC voltage, and the mathematical equation for calculating the root mean square value of the first voltage V1 is indicated as follows:

The AC value of the first voltage V1=$\sqrt{\text{sum of square of the sampled values}/\text{Tn}}$.

When the differential value between the maximum sampled value Smax and the minimum sampled value Smin is not greater than a predetermined differential value Sp, the controller 112 identifies the first voltage V1 as a DC voltage and the process continues with the step S133$b$, thereby calculating the value of the first voltage V1 by a predetermined mathematical equation used to compute the magnitude of a DC voltage. In the instant embodiment, the value of a DC voltage is represented by the average value of the DC voltage, and the mathematical equation for calculating the average value of the first voltage V1 is indicated as follows:

The DC value of the first voltage V1=Sum of the sampled values/Tn.

Following the steps S133$a$ and S133$b$ is step S134, the controller 112 will reset the sample number Tn. Next, the controller 112 manipulates the first stage power circuit 1111 and the bypass switch 1113 according to the form and magnitude of the first voltage V1 at step S14. The operation of the first stage power circuit 1111 and the bypass switch 1113 is described as above, and it is not intended to dwell on the details of their operation herein. Next, the controller 112 will transmit power-related information, including the form and magnitude of the first voltage V1, the output voltage, output current, output power and the operating efficiency of the power supply units to the system control unit 10, thereby enabling the system control unit 10 to manipulate the power supply units 11-13 at step S15. A plausible scheme for the system control unit 10 to manipulate the power supply units 11-13 can be attained by controlling the first stage power circuit 11 to output an output power of 600 W, controlling the second stage power circuit 12 to output an output power of 200 W, and controlling the third stage power circuit 13 to turn off.

The aforesaid controllers 112, 122, 132 may be implemented by micro controller units (MCUs) or digital signal processors (DSPs). The bypass switch 1113 and the selection circuit 153 may be implemented by bipolar junction transistors (BM), metal-oxide-semiconductor field-effect transistors (MOSFETs), relays, or insulated gate bipolar transistors (IGBTs).

Figure 4:
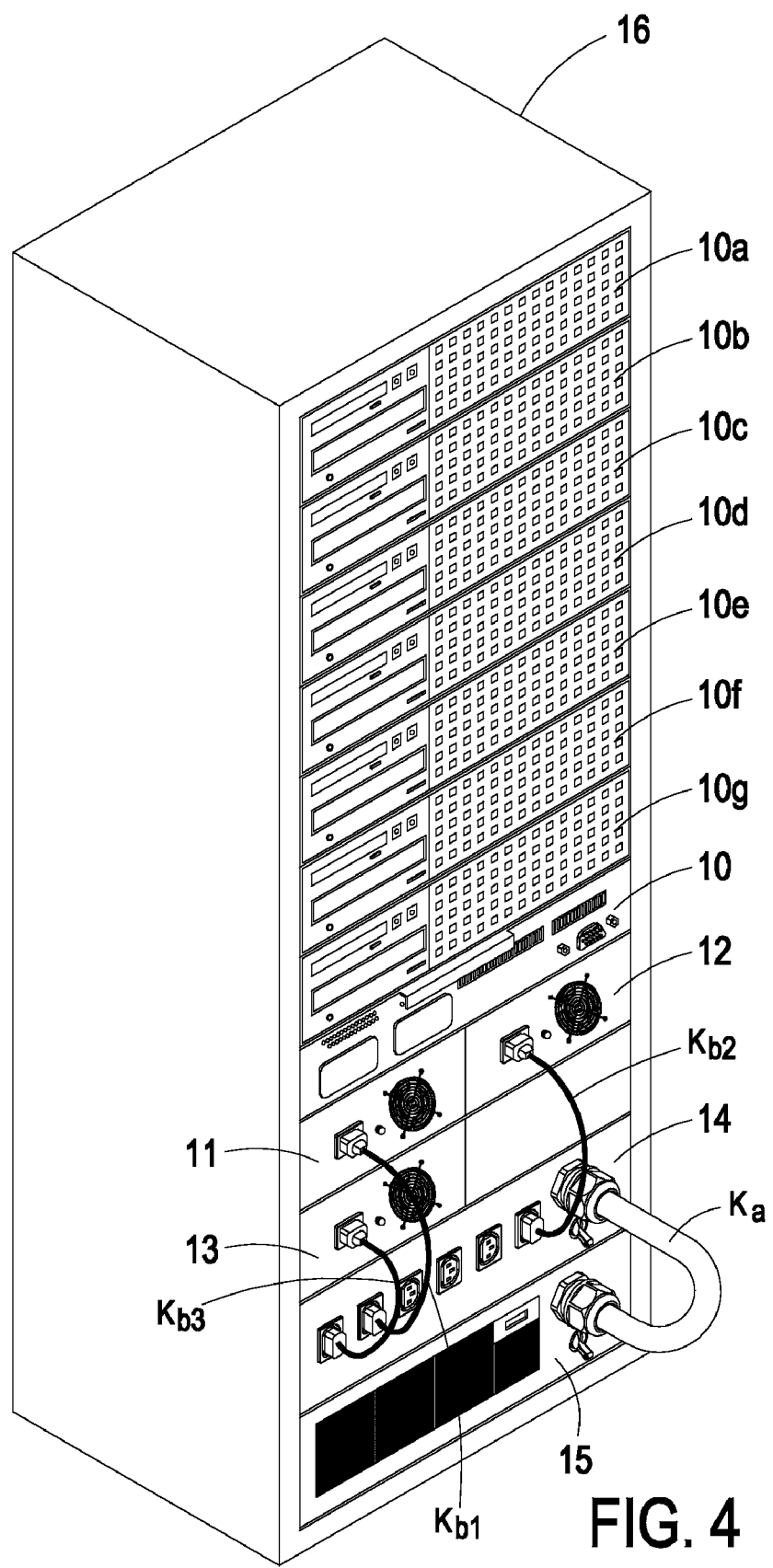
FIG. 4 is a plain view showing the structure of the power supply system according to a preferred embodiment of the invention.

Referring to FIG. 4 and FIG. 1, in which FIG. 4 illustrates the structural view of the power supply system according to a preferred embodiment of the invention. In FIG. 4, the rack 16 can be used to mount blade servers 10a-10g, system control unit 10, first power supply unit 11, second power supply unit 12, third power supply unit 13, power distribution unit 14, and UPS system 15 in order from the top down to the bottom. The power cable Ka is connected to the uninterruptible power supply system 15 and the power distribution unit 14, so that the first voltage V1 generated by the UPS system 15 is delivered to the power distribution unit 14 by the power cable Ka.

The first power supply unit 11, second power supply unit 12, and the third power supply unit 13 are connected to the power distribution unit 14 by a first power distribution cord Kb1, a second power distribution cord Kb2, and a third power distribution cord Kb3, respectively, thereby the first voltage V1 is delivered to the first power supply unit 11, second power supply unit 12, and third power supply unit 13 respectively by the first power distribution cord Kb1, the second power distribution cord Kb2, and the third power distribution cord Kb3. The output voltage Vo generated by means of the parallel interconnection of the first power supply unit 11, the second power supply unit 12, and the third power supply unit 13 is delivered to blade servers 10a-10g through an output DC voltage bus (not shown) which is implemented by copper strips.

In sum, the inventive power supply unit is capable of detecting the form of the first voltage to be inputted to power supply unit. Hence, the inventive power supply unit can manipulate the first stage power circuit and bypass switch according to the form and magnitude of the first voltage in order to boost the operating efficiency. When the inventive power supply unit is applied to a high-level DC power supply system, the problem that the power supply unit can not output the rated output voltage as a result of insufficient voltage level of the first voltage can be avoided. In addition, the UPS system of the inventive power supply system can selectively provide the first voltage in DC form or in AC form in a manual manner or in an automatic manner. In this way, the operating efficiency of the UPS system can be enhanced. Moreover, the applicability of UPS system can be extended to DC power supply systems in addition to the contemporary AC power supply system. Overall, the inventive power supply system can significantly enhance the overall efficiency if the first voltage is a high-level DC voltage.

While the invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the invention which is defined by the appended claims.

What is claimed is:

1. A power supply unit provided with AC/DC voltage detection, comprising:
    a first stage power circuit connected to a voltage bus for receiving a first voltage and generating a bus voltage accordingly;
    a second stage power circuit connected to the voltage bus for receiving the bus voltage and generating an output voltage accordingly;
    a bypass switch connected between an input terminal and an output terminal of the first stage power circuit; and
    a power control unit connected to the first stage power circuit, the second stage power circuit and the bypass switch for detecting whether the first voltage is a DC voltage or an AC voltage, and manipulating the first stage power circuit and the bypass switch accordingly;
    wherein the power control unit manipulate the first stage power circuit and the bypass switch to turn on and off according to the form and magnitude of the first voltage;
    wherein the power control unit comprises an AC/DC voltage detection circuit for detecting the form and magnitude of the first voltage, and the power control unit detects the form of the first voltage by determining whether a differential value between a maximum sampled value and a minimum sampled value produced by the AC/DC voltage detection circuit is greater than a predetermined differential value.

2. The power supply unit provided with AC/DC voltage detection according to claim 1 wherein if the first voltage is an AC voltage, the power control unit manipulates the bypass switch to turn off and manipulates the first stage power circuit to turn on, thereby enabling the first stage power circuit to generate the bus voltage.

3. The power supply unit provided with AC/DC voltage detection according to claim 1 wherein if the first voltage is a DC voltage and is greater than a predetermined value, the power control unit manipulates the bypass switch to turn on and manipulates the first stage power circuit to turn off, thereby disabling the first stage power circuit from generating the bus voltage.

4. The power supply unit provided with AC/DC voltage detection according to claim 3 wherein if the first voltage is a DC voltage and is less than a predetermined value, the power control unit manipulates the bypass switch to turn off and manipulates the first stage power circuit to turn on, thereby enabling the first stage power circuit to generate the bus voltage.

5. The power supply unit provided with AC/DC voltage detection according to claim 1 wherein the power control unit includes:
    a controller connected to the first stage power circuit, the second stage power circuit and the bypass switch for manipulating the first stage power circuit, the second stage power circuit and the bypass switch; and
    the AC/DC voltage detection circuit connected to the controller for detecting the form and magnitude of the first voltage and enabling the controller to acquire the form and magnitude of the first voltage therefrom.

6. The power supply unit provided with AC/DC voltage detection according to claim 5 wherein the AC/DC voltage detection circuit is a sampling unit or an analog-to-digital conversion unit.

7. The power supply unit provided with AC/DC voltage detection according to claim 6 wherein the controller accumulatively records sampled values produced by the AC/DC voltage detection circuit, and if an accumulated sample number reaches a default sample number, the controller performs an AC/DC voltage detection program to detect the form and magnitude of the first voltage.

8. The power supply unit provided with AC/DC voltage detection according to claim 7 wherein the AC/DC voltage detection program is configured to carry out the following steps of:
   (a) locating the maximum sampled value and the minimum sampled value;
   (b) determining whether the differential value between the maximum sampled value and the minimum sampled value is greater than the predetermined differential value;
   (c) If the differential value between the maximum sampled value and the minimum sampled value is greater than the predetermined differential value, identifying the first voltage as an AC voltage and calculating the magnitude of the first voltage by a predetermined mathematical equation used to compute the magnitude of an AC voltage; and
   (d) If the differential value between the maximum sampled value and the minimum sampled value is not greater than the predetermined differential value, identifying the first voltage as a DC voltage and calculating the magnitude of the first voltage by a predetermined mathematical equation used to compute the magnitude of a DC voltage.

9. The power supply unit provided with AC/DC voltage detection according to claim 1 wherein the power control unit transmits power-related information to a system control unit to enable the system control unit to manipulate the power supply unit according to the power-related information.

10. The power supply unit provided with AC/DC voltage detection according to claim 1 further comprising an electromagnetic interference filter connected to the first stage power circuit for reducing electromagnetic interference of the power supply unit.

11. A power supply system, comprising:
   an uninterruptible power supply system for receiving an input voltage and providing a first voltage in AC form or in DC form;
   a plurality of power supply units provided with AC/DC voltage detection for receiving the first voltage and converting the first voltage to an output voltage to power an electronic apparatus; and
   a power distribution unit connected between the uninterruptible power supply system and the plurality of power supply units for distributing the first voltage to the plurality of power supply units;
   wherein a power control unit of each power supply unit comprises an AC/DC voltage detection circuit for detecting the form and magnitude of the first voltage, and the power control unit detects the form of the first voltage by determining whether a differential value between a maximum sampled value and a minimum sampled value produced by the AC/DC voltage detection circuit is greater than a predetermined differential value.

12. The power supply system according to claim 11 wherein the power supply unit with AC/DC voltage detection includes:
   a first stage power circuit connected to a voltage bus for receiving the first voltage and generating a bus voltage accordingly;
   a second stage power circuit connected to the voltage bus for receiving the bus voltage and generating the output voltage accordingly;
   a bypass switch connected between an input terminal and an output terminal of the first stage power circuit; and
   the power control unit connected to a control terminal of the first stage power circuit, the second stage power circuit and the bypass switch for detecting whether the first voltage is an AC voltage or a DC voltage and respectively manipulate the first stage power circuit and the bypass switch;
   wherein the power control unit manipulate the bypass switch according to the form and magnitude of the first voltage.

13. The power supply system according to claim 11 wherein the uninterruptible power supply system includes:
   an AC-DC conversion circuit;
   an inverter circuit connected to the AC-DC conversion circuit;
   an energy storage unit connected to the AC-DC conversion circuit and the inverter circuit;
   a selection circuit having a first input terminal connected to an output terminal of the inverter circuit and a second input terminal connected to an output terminal of the AC-DC conversion circuit and the energy storage unit; and
   an uninterruptible power supply control unit connected to a control terminal of the inverter circuit and the selection unit for manipulating the uninterruptible power supply system;
   wherein the uninterruptible power supply control unit is configured to selectively output the first voltage in AC form or in DC form through an manipulation of the inverter circuit and the selection circuit in a manual or automatic manner.

14. The power supply system according to claim 13 wherein if the uninterruptible power supply system outputs the first voltage in DC form, the uninterruptible power supply control unit manipulates the second input terminal and an output terminal of the selection circuit to turn on and manipulates the inverter circuit to turn off so as to enable the selection circuit to output an output voltage of the AC-DC conversion circuit or an output voltage of the energy storage unit.

15. The power supply system according to claim 13 wherein if the uninterruptible power supply system outputs the first voltage in AC form, the uninterruptible power supply control unit manipulates the first input terminal and an output terminal of the selection circuit to turn on and manipulates the inverter circuit to turn on so as to enable the selection circuit to output an output voltage of the inverter circuit.

* * * * *